United States Patent
Kuroki

(10) Patent No.: US 10,224,862 B2
(45) Date of Patent: Mar. 5, 2019

(54) MOTOR DRIVING APPARATUS HAVING DISCHARGING FUNCTION

(71) Applicant: FANUC CORPORATION, Yamanashi (JP)

(72) Inventor: Wataru Kuroki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/405,497

(22) Filed: Jan. 13, 2017

(65) Prior Publication Data

US 2017/0222596 A1    Aug. 3, 2017

(30) Foreign Application Priority Data

Jan. 29, 2016   (JP) .................................. 2016-016534

(51) Int. Cl.
*H02P 1/04* (2006.01)
*H02P 29/68* (2016.01)
(Continued)

(52) U.S. Cl.
CPC .............. *H02P 29/68* (2016.02); *H02P 25/03* (2016.02); *H02P 27/08* (2013.01)

(58) Field of Classification Search
USPC ............. 318/662, 794, 817, 602, 75, 400.17
See application file for complete search history.

(56) References Cited

U.S. PATENT DOCUMENTS 9,787,213 B2 *   10/2017   Wei ........................ H02M 5/458

2014/0003099 A1 *   1/2014   Dillig .................... H02M 5/458
363/37

(Continued)

FOREIGN PATENT DOCUMENTS

CN          102386844 A       3/2012
CN          105099280 A       11/2015
(Continued)

OTHER PUBLICATIONS

English Abstract for Japanese Publication No. 5721787 B2, published May 20, 2015, 1 pg.
English Abstract for Japanese Publication No. 5444304 B2, published Mar. 19, 2014, 2 pgs.
English Abstract for Japanese Publication No. 2004-357412 A, published Dec. 16, 2004, 1 pg.
(Continued)

*Primary Examiner* — Eduardo Colon Santana
*Assistant Examiner* — Iftekhar Mustafa
(74) *Attorney, Agent, or Firm* — Fredrikson & Byron, P.A.

(57) ABSTRACT

A motor driving apparatus includes an AC-DC conversion unit that converts AC power into DC power, a power storage unit provided in a DC link between the AC-DC conversion unit and a DC-AC conversion unit, an initial charging unit that is provided in the DC link, includes a switch unit and a charging resistor connected to the switch unit in parallel, and initially charges the power storage unit, an electromagnetic contactor that opens and closes an electrical path between the AC power source and the AC-DC conversion unit, and a control unit, and after completion of driving of a motor, the control unit performs an opening operation on the electromagnetic contactor and the switch unit and performs a turn-on operation on each of the switching devices provided on the upper and lower arms in the same phase to discharge charge stored in the power storage unit by the charging resistor.

4 Claims, 8 Drawing Sheets

(51) Int. Cl.
*H02P 25/03* (2016.01)
*H02P 27/08* (2006.01)

(56) References Cited

U.S. PATENT DOCUMENTS

| | | | |
|---|---|---|---|
| 2014/0144998 A1* | 5/2014 | Ichishi | B60H 1/00314 237/12.3 A |
| 2015/0229118 A1* | 8/2015 | Hasunuma | H01C 7/02 361/93.8 |

FOREIGN PATENT DOCUMENTS

| | | | |
|---|---|---|---|
| JP | 898537 | A | 4/1996 |
| JP | 8168250 | A | 6/1996 |
| JP | 8331870 | A | 12/1996 |
| JP | 2004357412 | A | 12/2004 |
| JP | 5444304 | B2 | 3/2014 |
| JP | 5721787 | B2 | 5/2015 |
| JP | 2015107045 | A | 6/2015 |
| JP | 2015216018 | A | 12/2015 |

OTHER PUBLICATIONS

English Abstract and Machine Translation for Japanese Publication No. 2015-216018 A, published Dec. 3, 2015, 34 pgs.
English Abstract and Machine Translation for Japanese Publication No. 2015-107045 A, published Jun. 8, 2015, 9 pgs.
English Abstract and Machine Translation for Japanese Publication No. 08-331870 A, published Dec. 13, 1996, 7 pgs.
English Abstract and Machine Translation for Japanese Publication No. 08-168250 A, published Jun. 25, 1996, 11 pgs.
English Abstract and Machine Translation for Japanese Publication No. 08-098537 A, published Apr. 12, 1996, 15 pgs.
Untranslated Decision to Grant a Patent mailed by Japan Patent Office (JPO) for Application No. JP 2016-016534 dated Jan. 9, 2018, 3 pages.
English machine translation of Decision to Grant a Patent mailed by Japan Patent Office (JPO) for Application No. JP 2016-016534 dated Jan. 9, 2018, 3 pages.
English Abstract and Machine Translation for Chinese Publication No. 102386844 A, published Mar. 21, 2012, 6 pgs.
English Abstract and Machine Translation for Chinese Publication No. 105099280 A, published Nov. 25, 2015, 8 pgs.

\* cited by examiner

MOTOR DRIVING APPARATUS HAVING DISCHARGING FUNCTION

BACKGROUND OF THE INVENTION

1. Field of the Invention

The present invention relates to a motor driving apparatus for controlling a motor that converts alternating-current (AC) power of an AC power source side into direct-current (DC) power and then further converts the DC power into the AC power to use the AC power as driving power, in particular, to a motor driving apparatus including an initial charging unit that initially charges a power storage unit provided in a DC link.

2. Description of the Related Art

Motor driving apparatuses that drive and control servomotors in machine tools, industrial machines, forging machines, injection molding machines, or various robots after converting AC power on AC power source sides into DC power, further convert DC power into AC power, and use t AC power as driving power of the motors. The motor driving apparatus includes: an AC-DC conversion unit (also referred to as a "forward converter" or a "converter") that converts AC power supplied from an AC power source side of a commercial three-phase AC power source into DC power and output the DC power; and a DC-AC conversion unit (also referred to as a "reverse converter" or an "inverter") that is connected to a DC link at a DC output side of the AC-DC conversion unit and converts the DC power in the DC link into the AC power for driving a motor and outputs the AC power, and controls a speed, torque, or a position of a rotor of the motor connected to an AC output side of the DC-AC conversion unit.

The DC link connecting the DC output side of the AC-DC conversion unit and a DC input side of the DC-AC conversion unit is provided with a power storage unit that can store the DC power. A DC capacitor is an example of the power storage unit.

The power storage unit needs to be initially charged in a period from immediately after start-up of the motor driving apparatus to before start of driving of the motor (i.e., before the DC-AC conversion unit starts a power conversion operation for supplying the AC power to the motor). Charge is stored in the power storage unit after completion of driving of the motor, and the charge stored in the power storage unit may be discharged to prevent an electric shock. For example, there are a method for reducing the charge in the power storage unit using self-discharge of the power storage unit and a method for consuming the charge by a resistor separately prepared.

FIG. 7 illustrates a configuration of a general motor driving apparatus including an initial charging unit. A motor driving apparatus 100 includes an AC-DC conversion unit 111 that converts AC power supplied from a commercial three-phases (an R-phase, an S-phase, and a T-phase) AC power source 3 into DC power and outputs the DC power and a DC-AC conversion unit 117 that is connected to a DC link at a DC output side of the AC-DC conversion unit 111 and converts the DC power in the DC link into the AC power for driving a motor and outputs the AC power, and controls a speed, torque, or a position a rotor of a motor 2 connected to an AC output side of the DC-AC conversion unit 117.

The AC-DC conversion unit 111 is configured as a full-bridge circuit in which a switching device and a feedback diode connected in reverse parallel to the switching device are provided in an upper arm and a lower arm in each phase. The switching devices provided in the upper arm and the lower arm are on-off controlled or all of the switching devices are turned off in response to a switching command received from a control unit 115, so that the AC power supplied from the AC power source 3 side is rectified by the diodes and converted and output as the DC power. An AC reactor 118 is connected to an AC input side of the AC-DC conversion unit 111.

An electromagnetic contactor 114 is provided on the AC input side of the AC-DC conversion unit 111 so as to open and close an electrical path between the AC power source 3 and the AC-DC conversion unit 111. In the electromagnetic contactor 114, contacts 124 are normally in a disconnected state by spring force, however, when power is supplied to a control coil 123, attraction force greater than the spring force is generated by an electromagnet, the contacts 124 connect the circuit, and the power is supplied from the AC power source 3 to the AC-DC conversion unit 111. When the power to the control coil 123 is turned off, the circuit is disconnected by the spring force, and the power supply from the AC power source 3 to the AC-DC conversion unit 111 is cut off. An opening/closing operation of an electrical path of the electromagnetic contactor 114 is controlled by an electromagnetic contactor opening/closing command output from the control unit 115.

The DC link for connecting the DC output side of the AC-DC conversion unit 111 and a DC input side of the DC-AC conversion unit 117 is provided with a power storage unit 112 that can store the DC power. In the illustrated example, the power storage unit 112 is a DC capacitor. The power storage unit 112 is initially charged in a period from immediately after start-up of the motor driving apparatus 100 (i.e., immediately after the electromagnetic contactor 114 is closed (turned on)) to before start of driving of the motor 2 (i.e., before start of a power conversion operation by the DC-AC conversion unit 117). Immediately after the start of the initial charging of the power storage unit 112 from a state in which no charge is stored therein, a large inrush current flows through the AC-DC conversion unit 111. In particular, as the power storage unit 112 has a larger capacitance, a larger inrush current is generated. As a countermeasure against the inrush current, the motor driving apparatus 100 is provided with an initial charging unit 113 between the AC-DC conversion unit 111 and the power storage unit 112. The initial charging unit 113 includes a switch unit 121 for shorting a charging resistor and a charging resistor 122 connected to the switch unit 121 in parallel. The switch unit 121 is opened (turned off) only during a period of the initial charging of the power storage unit 112 executed immediately after the start-up of the motor driving apparatus 100 and maintains a closed (turned on) state during a normal operation period in which the motor driving apparatus 100 drives the motor 2. During the initial charging period of the power storage unit 112, the switch unit 121 is opened (turned off), and the DC power output from the AC-DC conversion unit 111 flows through the charging resistor 122 and is consumed by the charging resistor 122 as heat, so that generation of an excessive inrush current is suppressed during the initial charging period. An opening/closing operation of an electrical path of the switch unit 121 in the initial charging unit 113 is controlled by a shorting command output from the control unit 115.

In order to discharge the charge in the power storage unit 112 after completion of driving of the motor, for example, a discharging unit 116 is provided. The discharging unit 116 includes a switch unit 125 for a discharging resistor and a discharging resistor 126 connected to the switch unit 125 in series. After completion of driving of the motor, the electromagnetic contactor 114 is opened (turned off), and the switch unit 125 is closed (turned on), so that the charge stored in the power storage unit 112 is consumed by the discharging resistor 126. An opening/closing operation of an electrical path of the switch unit 125 in the discharging unit 116 is controlled by a discharging command output from the control unit 115.

Other than a method of discharging using the discharging resistor as described above, there is a method of discharging using a resistance component included in a motor as described in Japanese Patent No. 5444304 and Japanese Unexamined Patent Publication (Kokai) No. 2004-357412. FIG. 8 illustrates discharging of a power storage unit in a motor driving apparatus described in Japanese Patent No. 5444304. Operations and configurations of an AC-DC conversion unit 111, a power storage unit 112, an initial charging unit 113, an electromagnetic contactor 114, a DC-AC conversion unit 117, and an AC reactor 118 in a motor driving apparatus 200 are as described above with reference to FIG. 7. In the motor driving apparatus 200 described in Japanese Patent No. 5444304, the electromagnetic contactor 114 is closed (turned on) by an electromagnetic contactor opening/closing command generated by the control unit 115, and the switch unit 121 for shorting the charging resistor is closed (turned on) by a shorting command generated by the control unit 115 so as to discharge the charge in the power storage unit 112 stored at the time of deceleration control of the motor. The DC power stored in the power storage unit 112 is converted into a reactive current by the DC-AC conversion unit 117 based on a reactive current command from the control unit 115 and supplied to the motor 2. Accordingly, the motor 2 consumes the DC power stored in the power storage unit 112 in a form of the reactive current.

Other than the above-described method, there is a method of discharging using a resistance component included in an element other than a resistor in a circuit.

For example, as described in Japanese Patent No. 5721787, there is a method for discharging a capacitor by appropriately controlling a switching operation of a switching device in a boost converter provided at a preceding stage of an inverter.

As described above, the charge is stored in the power storage unit after completion of driving of the motor, and thus the charge stored in the power storage unit may be discharged to prevent an electric shock.

However, the method using self-discharge of the power storage unit has a problem that it takes time to reduce the charge in the power storage unit.

The method for separately providing the discharging unit for discharging the power storage unit has a problem that the apparatus is enlarged and costs increase because the switch unit and the discharging resistor are needed.

The methods described in Japanese Patent No. 5444304 and Japanese Unexamined Patent Publication (Kokai) No. 2004-357412 have a problem that the motor and the DC-AC conversion unit may have cooling capacities sufficient for dealing with discharging of the charge stored in the power storage unit that enlarge the apparatus and increase costs.

The method described in Japanese Patent No. 5721787 also has a problem that the charge stored in the power storage unit is to be consumed by an element other than the discharging resistor, so that a thermal capacity and a cooling capacity of the element other than the discharging resistor are to be improved that enlarge the apparatus and increase costs.

SUMMARY OF INVENTION

In view of the problems as described above, it is an object of the invention to provide a space saving and low cost motor driving apparatus converting AC power supplied from an AC power source side to DC power by an AC-DC conversion unit, outputting the DC power to a DC link provided with a power storage unit, and further converting the DC power into the AC power for driving a motor and supplying the AC power to the motor, that can discharge charge stored in the power storage unit in a short time.

In order to achieve the above-described object, a motor driving apparatus includes an AC-DC conversion unit configured to convert AC power supplied from an AC power source side into DC power by the motor driving apparatus performing on-off control on switching devices respectively provided on an upper arm and a lower arm or turning off all of the switching devices and rectifying the AC power by diodes, a power storage unit provided in a DC link between a DC output side of the AC-DC conversion unit and a DC input side of a DC-AC conversion unit configured to convert DC power on the DC output side of the AC-DC conversion unit into AC power for driving a motor, an initial charging unit provided in the DC link and including a switch unit configured to open and close an electrical path between the AC-DC conversion unit and the power storage unit and a charging resistor connected to the switch unit in parallel, wherein the initial charging unit is configured to initially charge the power storage unit by a direct current from the AC-DC conversion unit flowing through the charging resistor when the switch unit is opened before start of driving of the motor, an electromagnetic contactor configured to open and close an electrical path between the AC power source and the AC-DC conversion unit, and a control unit configured to control each of the switching devices, the switch unit, and the electromagnetic contactor, wherein, after completion of driving of the motor, the control unit performs an opening operation on the electromagnetic contactor and the switch unit and performs a turn-on operation on each of the switching devices provided on the upper arm and the lower arm in the same phase, and thus forms a closed circuit constituted of the power storage unit and the charging resistor to discharge charge stored in the power storage unit by the charging resistor.

Before start of driving of the motor, the control unit may perform a closing operation on the electromagnetic contactor and perform an opening operation on the switch unit to open the switch unit, and initially charge the power storage unit by a direct current from the AC-DC conversion unit flowing through the charging resistor, and after a voltage of the power storage unit reaches a specified voltage by initial charging, the control unit may perform a closing operation on the switch unit to complete initial charging of the power storage unit.

The motor driving apparatus may further include a temperature detection unit configured to detect a temperature of the charging resistor, wherein after completion of driving of the motor, when a temperature detected by the temperature detection unit becomes a specified temperature or higher, the control unit may perform a turn-off operation on each of the switching devices provided on the upper arm or the lower arm in the same phase to pause discharging by the charging resistor.

The motor driving apparatus may further include a temperature detection unit configured to detect a temperature of the charging resistor, wherein, after completion of driving of the motor, when a temperature detected by the temperature detection unit is lower than a specified temperature, the control unit may perform an opening operation on the electromagnetic contactor and the switch unit, perform a turn-on operation on each of the switching devices provided on the upper arm and the lower arm in the same phase, and thus form a closed circuit constituted of the power storage unit and the charging resistor to discharge charge stored in the power storage unit by the charging resistor, and when a temperature detected by the temperature detection unit is the specified temperature or higher, the control unit may perform a turn-off operation on each of the switching devices provided on the upper arm or the lower arm in the same phase to stop discharging by the charging resistor.

BRIEF DESCRIPTION OF THE DRAWINGS

The present invention will be understood more clearly by referring to the following accompanying drawings.

DETAILED DESCRIPTION

A motor driving apparatus having a discharging function will be described below with reference to the drawings. It should be understood that the invention is not limited to the drawings or embodiments described below.

Figure 1:
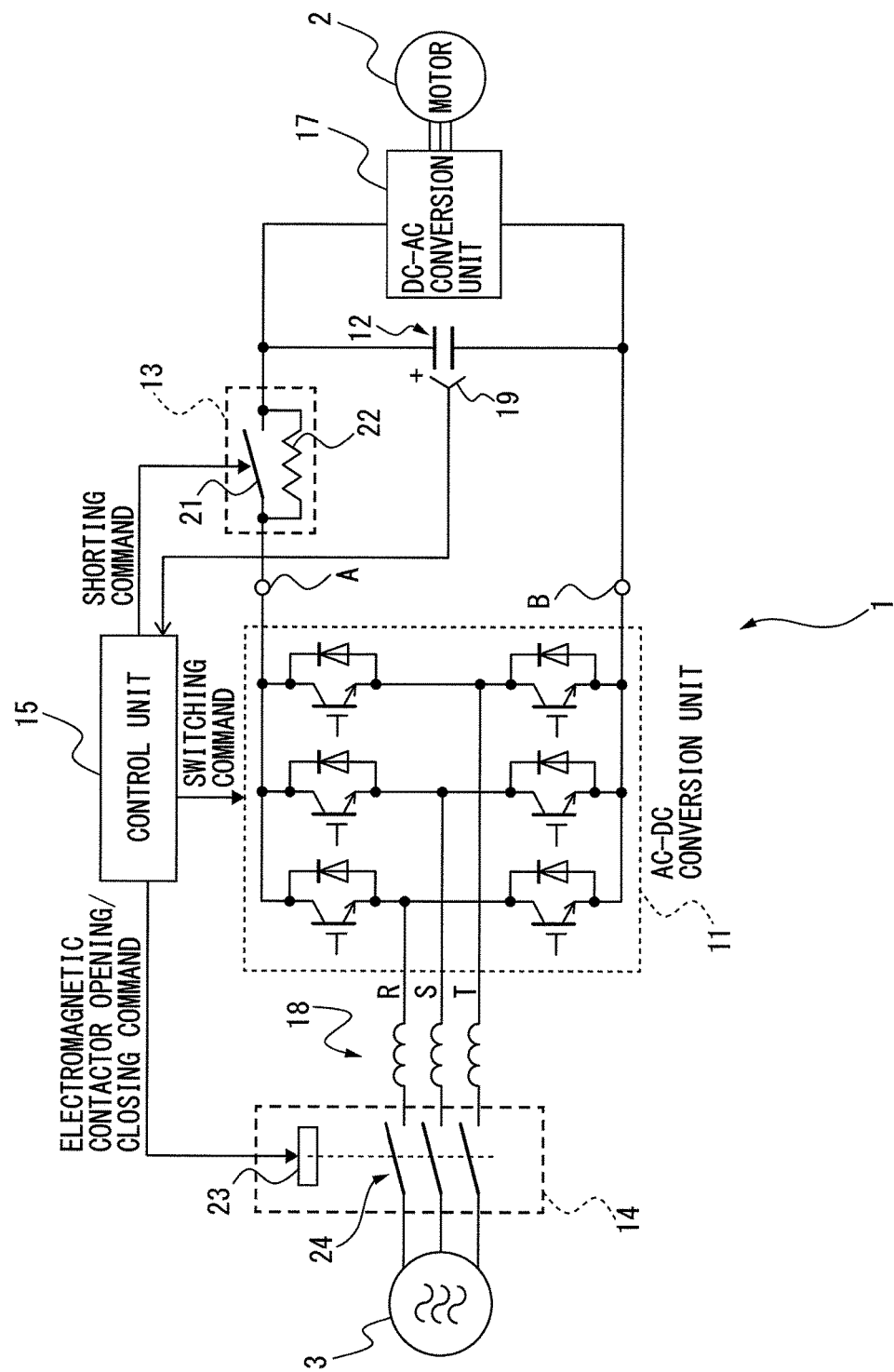
FIG. 1 is a circuit diagram illustrating a motor driving apparatus in a first embodiment.

FIG. 1 is a circuit diagram illustrating a motor driving apparatus in a first embodiment. Hereinbelow, components denoted by the same reference numerals in the different drawings have the same function. A type of a motor 2 driven by a motor driving apparatus 1 does not limit the present invention and may be, for example, an induction motor or a synchronous motor. Further, the number of phases does not limit the present invention and may be, for example, a single phase or multiple phases other than three phases.

The motor driving apparatus 1 in the first embodiment includes an AC-DC conversion unit 11, a power storage unit 12, an initial charging unit 13, an electromagnetic contactor 14, and a control unit 15. An AC power source 3 is connected to an AC input side of the motor driving apparatus 1, and a three-phase motor 2 is connected to an AC motor side of the motor driving apparatus 1. The motor driving apparatus 1 that drives and controls a piece of the motor 2 is described here, however, the number of the motors 2 driven and controlled by the motor driving apparatus 1 does not limit the present invention, and a plurality of the motors 2 may be provided. The motor driving apparatus 1 includes a DC-AC conversion unit 17 that supplies AC power for driving the motor 2, and when there is a plurality of the motors 2, a plurality of the DC-AC conversion units 17 is also provided.

The AC-DC conversion unit (also referred to as "the forward converter" or "the converter") 11 is configured as a full-bridge circuit in which a switching device and a feedback diode connected in reverse parallel to the switching device are provided in an upper arm and a lower arm in each phase. In the illustrated example, the AC-DC conversion unit 11 is configured as a three-phase full-bridge circuit that converts three-phase AC power into DC power. The AC-DC conversion unit 11 performs on-off control on the switching devices or turns off all of the switching devices provided in the upper arm and the lower arm in response to a switching command received from the control unit 15, rectifies the AC power by the diodes, and thus converts the AC power supplied from the AC power source 3 side and outputs the DC power. Examples of the switching devices include IGBT, FET, GTO (a thyristor, a gate turn-off thyristor), transistors, and the like. However, a type itself of the switching device does not limit the present invention, and other switching devices may be used.

An AC reactor 18 is connected to an AC input side of the AC-DC conversion unit 11.

The DC-AC conversion unit (also referred to as "the reverse converter" or "the inverter") 17 is connected to the AC-DC conversion unit 11 via the DC link. The DC-AC conversion unit 17 converts the DC power in the DC link into the AC power for driving the motor and output the AC power. The DC-AC conversion unit 17 is configured as a three-phase full-bridge circuit including a switching device and a feedback diode connected in reverse parallel to the switching device, such as a pulse-width modulation (PWM) inverter. As examples of semiconductor switching devices, there are an IGBT, an FET, a thyristor, a GTO, a transistor, and the like, however, a type itself of the switching device does not limit the present invention, and other semiconductor switching devices may be used. The DC-AC conversion unit 17 performs a switching operation on the internal switching device based on a switching command received from a high-order controller (not illustrated) and converts the DC power supplied from the DC link side into the three-phase AC power having a desired voltage and a desired frequency for driving the motor 2. The motor 2 is operated based on the supplied three-phase AC power of which voltage and frequency are variable. The control unit 15 described below may generate the switching command for controlling the switching operation of the DC-AC conversion unit 17.

The power storage unit 12 is provided in the DC link between a DC output side of the AC-DC conversion unit 11 and a DC input side of the DC-AC conversion unit 17 and can store the DC power. A DC capacitor is an example of the power storage unit 12. In the present embodiment, the power storage unit 12 is a separate entity from the AC-DC conversion unit 11 and the DC-AC conversion unit 17, however, generally, a smoothing capacitor (not illustrated) having a function of suppressing a ripple of the DC output is built in the DC output side of the AC-DC conversion unit 11, and a smoothing capacitor (not illustrated) having a function of suppressing a ripple of the DC input is built in the DC input side of the DC-AC conversion unit 17, so that the smoothing capacitors built in the AC-DC conversion unit 11 and the DC-AC conversion unit 17 may be used as the power storage unit 12 as a modification of the present embodiment. FIG. 1 illustrates an example provided with one piece of the DC-AC conversion unit 17, however, for example, when a plurality of the DC-AC conversion units 17 is connected in parallel, the individual power storage unit 12 may be provided on the DC input side of each of the DC-AC conversion units 17, and in this case, the power storage units 12 are in a parallelly connected relationship with each other. The power storage unit 12 is initially charged by the DC power output from the AC-DC conversion unit 11 by the initial charging unit 13 described next in a period from immediately after start-up of the motor driving apparatus 1 (i.e., immediately after the electromagnetic contactor 14 is closed (turned on)) to before start of driving of the motor 2 (i.e., before start of a power conversion operation by the DC-AC conversion unit 17). A voltage of the power storage unit 12 is detected by a voltage detection unit 19.

The initial charging unit 13 is provided in the DC link and includes a switch unit 21 for opening and closing an electrical path between the AC-DC conversion unit 11 and the power storage unit 12 and a charging resistor 22 connected to the switch unit 21 in parallel. The charging resistor 22 may be a fixed resistor or a variable resistor as long as the charging resistor 22 is a high breakdown voltage resistor. Alternatively, the charging resistor 22 may be an element (i.e., a coil) including a resistance component other than these resistors. Although the details are described below, in the present invention, discharging is performed using the charging resistor 22. In order to realize discharging using the charging resistor 22, the switch unit 21 for shorting the charging resistor may be realized by a mechanical component, such as a mechanical relay and a mechanical switch, that does not allow a current to flow when opened (turned off) or an electronic component, such as a triac (registered trademark) (a bidirectional thyristor) that does not easily allow a current to flow when opened (turned off) and a switching device (i.e., a gallium nitride (GaN) FET) that does not include a parasitic diode.

The switch unit 21 for shorting the charging resistor is opened (turned off) only during a period of the initial charging of the power storage unit 12 executed immediately after the start-up of the motor driving apparatus 1 and maintains a closed (turned on) state during a normal operation period in which the motor driving apparatus 1 drives the motor 2. More specifically, the switch unit 21 is opened (turned off) during the initial charging period from immediately after the start-up of the motor driving apparatus 1 (i.e., immediately after the electromagnetic contactor 14 is closed (turned on)) to before the start of driving of the motor 2 (i.e., before the start of a power conversion operation by the DC-AC conversion unit 17), so that a DC current output from the AC-DC conversion unit 11 flows into the power storage unit 12 through the charging resistor 22, and the power storage unit 12 is charged. When the power storage unit 12 is charged to a specified voltage, the switch unit 21 is closed (turned on) to short-circuit both ends of the charging resistor 22, and the initial charging operation is completed. Subsequently, the DC-AC conversion unit 17 starts the power conversion operation and supplies driving power to the motor 2, and the motor 2 is driven based on the driving power. As described above, during the initial charging period of the power storage unit 12, the switch unit 21 is opened (turned off), and the DC power output from the AC-DC conversion unit 11 flows through the charging resistor 22 and is consumed by the charging resistor 22 as heat, so that generation of an excessive inrush current is suppressed during the initial charging period. An opening/closing operation of an electrical path of the switch unit 21 in the initial charging unit 13 is controlled by a shorting command output from the control unit 15. A shorting command may be generated by a higher-order controller (not illustrated) than the control unit 15.

The electromagnetic contactor 14 is provided on the AC input side of the AC-DC conversion unit 11 so as to open and close an electrical path between the AC power source 3 and the AC-DC conversion unit 11. In the present embodiment, the electromagnetic contactor 14 is provided further nearer to the AC power source 3 side than the AC reactor 18 provided on the AC input side of the AC-DC conversion unit 11. In the electromagnetic contactor 14, contacts 24 are normally in a disconnected state by spring force. However, when power is supplied to a control coil 23, attraction force greater than the spring force is generated by an electromagnet, the contacts 24 connect the circuit, and the power is supplied from the AC power source 3 to the AC-DC conversion unit 11. When the power to the control coil 23 is turned off, the circuit is disconnected by the spring force, and the power supply from the AC power source 3 to the AC-DC conversion unit 11 is cut off. An opening/closing operation of an electrical path of the electromagnetic contactor 14 is controlled by an electromagnetic contactor opening/closing command output from the control unit 15. The opening/closing command to the electromagnetic contactor 14 may be generated by the higher-order controller (not illustrated) than the control unit 15.

The control unit 15 generates the switching command for controlling the switching operation of each switching device in the AC-DC conversion unit 11, the shorting command for controlling the opening/closing operation of the electrical path of the switch unit 21 for shorting the charging resistor in the initial charging unit 13, and the electromagnetic contactor opening/closing command for controlling the opening/closing operation of the electrical path of the electromagnetic contactor 14. Operations of the control unit 15 are described in details with reference to flowcharts in FIG. 2 and FIG. 3.

Figure 2:
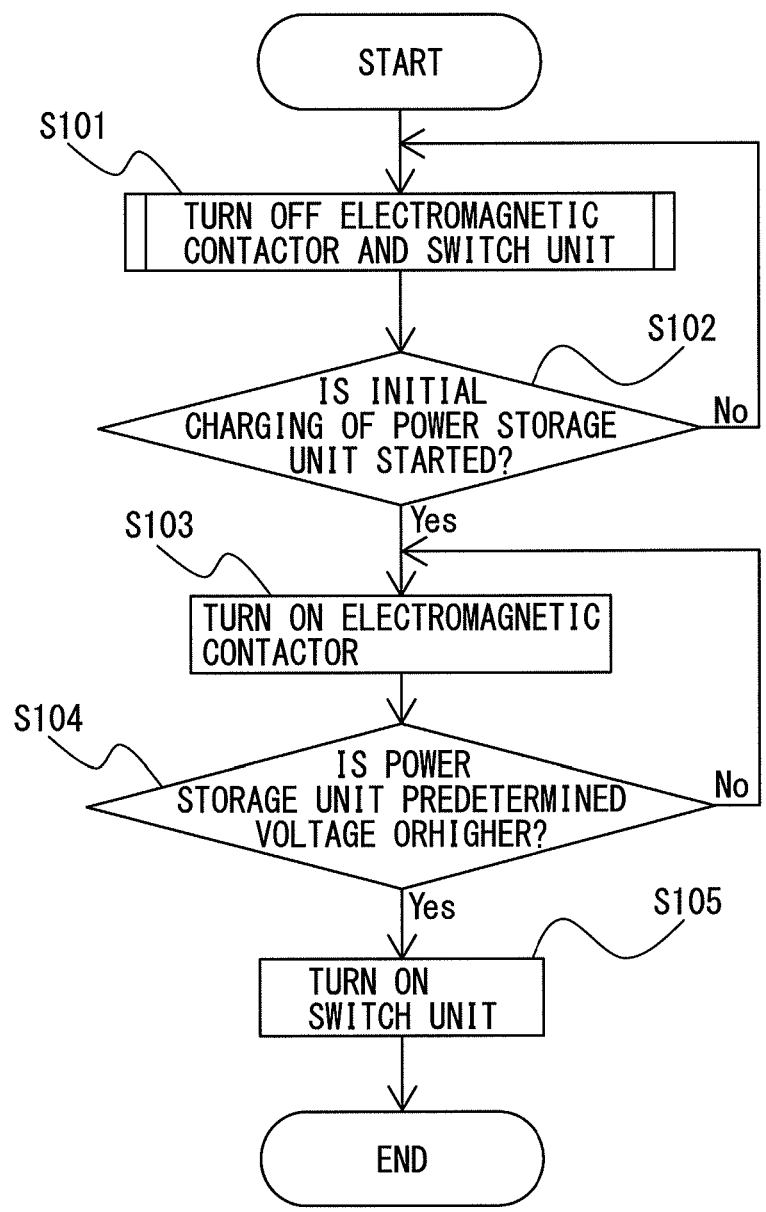
FIG. 2 is a flowchart illustrating an operation flow regarding initial charging of the motor driving apparatus in the first embodiment.

FIG. 2 is a flowchart illustrating an operation flow regarding the initial charging of the motor driving apparatus in the first embodiment.

Before the start of driving of the motor, the electromagnetic contactor 14 and the switch unit 21 are both opened (turned off) (step S101).

In step S102, the control unit 15 determines whether to start initial charging of the power storage unit 12. The determination is made based on, for example, whether an initial charging start command is received from the higher-order controller (not illustrated) of the control unit 15. The initial charging start command is transmitted to the control unit 15 by, for example, an operator performing a start operation (i.e., pressing of a start-up button) on the motor driving apparatus 1. In step S102, when determining to start the initial charging of the power storage unit 12, the control unit 15 outputs a closing command to the electromagnetic contactor 14.

In step S103, the electromagnetic contactor 14 performs a closing (turn-on) operation in response to the received closing command. Accordingly, the AC power flows from the AC power source 3 to the AC-DC conversion unit 11. Although it is not illustrated here, the AC-DC conversion unit 11 performs the on-off control on the switching devices or turns off all of the switching devices by receiving the switching command from the control unit 15, rectifies the AC power by the diodes, and converts the AC power supplied from the AC power source 3 side and outputs the DC power. Accordingly, the DC current output from the AC-DC conversion unit 11 flows into the power storage unit 12 through the charging resistor 22, and the power storage unit 12 is charged. The voltage of the power storage unit 12 is gradually increased by the charging.

In step S104, the control unit 15 determines whether the voltage of the power storage unit 12 reaches a specified voltage. A voltage value of the power storage unit 12 is detected by the voltage detection unit 19 and transmitted to the control unit 15. When it is determined that the voltage of the power storage unit 12 reaches the specified voltage, the processing proceeds to step S105.

In step S105, the control unit 15 outputs the closing command to the initial charging unit 13, and the switch unit 21 in the initial charging unit 13 is closed (turned on). Accordingly, the initial charging of the power storage unit 12 is completed. After completion of the initial charging, the motor driving apparatus 1 starts to drive the motor 2.

Figure 3:
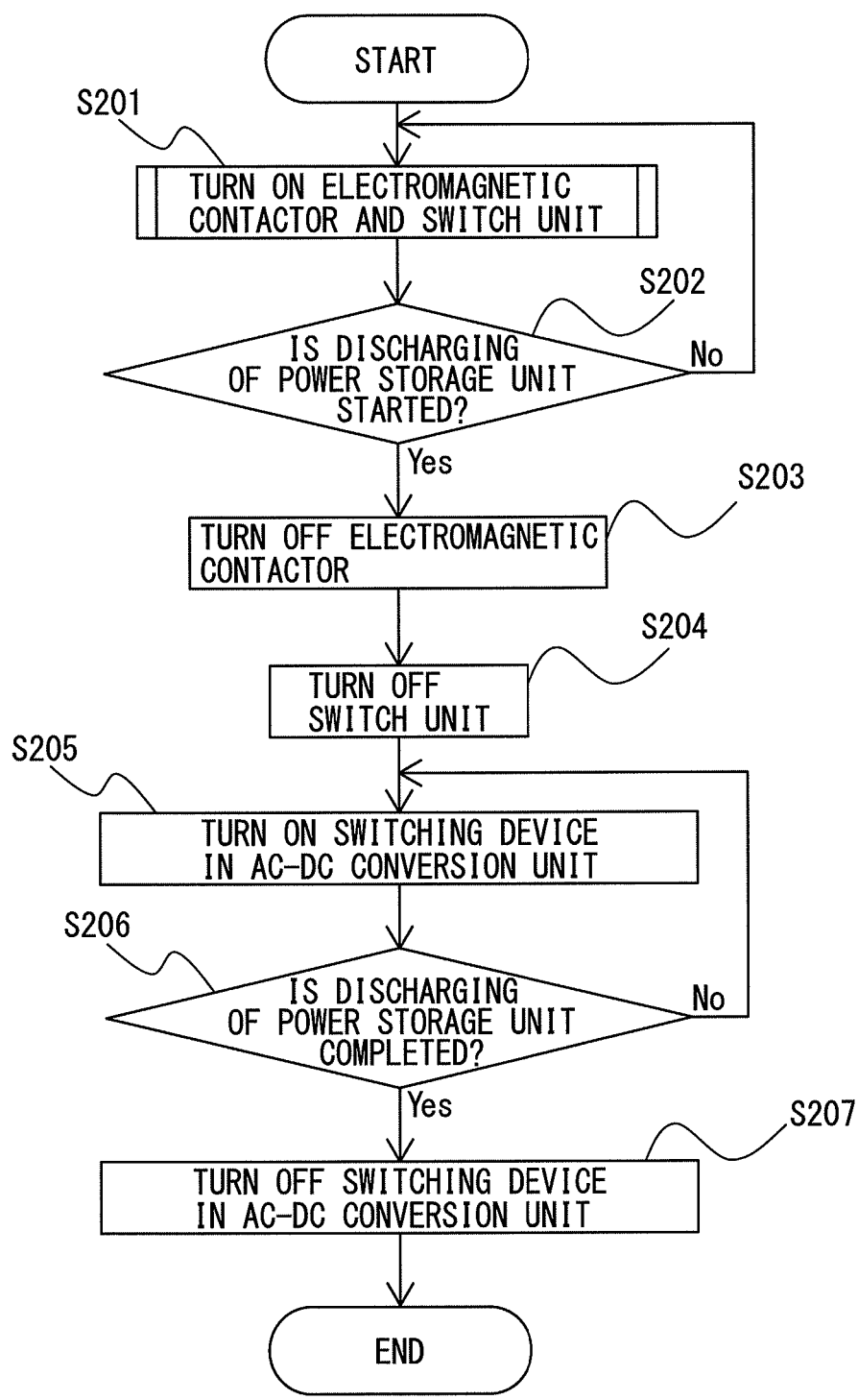
FIG. 3 is a flowchart illustrating an operation flow regarding discharging of a power storage unit of the motor driving apparatus in the first embodiment.

FIG. 3 is a flowchart illustrating an operation flow regarding discharging of the power storage unit of the motor driving apparatus in the first embodiment.

During a motor driving period by the motor driving apparatus 1, the electromagnetic contactor 14 and the switch unit 21 are both closed (turned on) (step S201).

In step S202, the control unit 15 determines whether to start discharging of the power storage unit 12. The determination is made based on, for example, whether a discharging start command is received from the high-order controller (not illustrated) of the control unit 15. The discharging start command is transmitted to the control unit 15 by, for example, the operator performing a pause operation (i.e., pressing of a pause button) on the motor driving apparatus 1. In step S202, when determining to start the discharging of the power storage unit 12, the control unit 15 outputs an opening command to the electromagnetic contactor 14.

In step S203, the electromagnetic contactor 14 performs an opening (turn-off) operation in response to the received opening command. Accordingly, the AC power supply from the AC power source 3 to the AC-DC conversion unit 11 is cut off.

In step S204, the control unit 15 outputs the opening command to the initial charging unit 13. Accordingly, the switch unit 21 in the initial charging unit 13 is opened (turned off).

Next, in step S205, the control unit 15 outputs, to the AC-DC conversion unit 11, the switching command for causing the switching devices respectively provided on the upper arm and the lower arm in the same phase to perform the turn-on operation. Accordingly, the switching devices respectively provided on the upper arm and the lower arm in the same phase are electrically connected in the AC-DC conversion unit 11, and a point A and a point B in the drawing are brought into a short-circuited state. The phase (the R-phase, the S-phase, and the T-phase) of the upper and lower arms of the switching devices to be electrically connected may be only one phase, two phases, or all of the three phases. When the switching devices respectively provided on the upper arm and the lower arm are electrically connected, the point A and the point B are brought into the short-circuited state, and the electrical path of the switch unit 21 in the initial charging unit 13 is opened (turned off), so that a closed circuit constituted of the power storage unit 12 and the charging resistor 22 is formed, and the charge stored in the power storage unit 12 flows into the charging resistor 22 through the electrically connected respective switching devices in the same phase. Accordingly, the energy stored in the power storage unit 12 is discharged by the charging resistor 22, and the voltage of the power storage unit 12 is gradually decreased.

In step S206, the control unit 15 determines whether the discharging of the power storage unit 12 is completed. The determination is made based on, for example, whether the voltage of the power storage unit 12 detected by the voltage detection unit 19 becomes a predetermined voltage or less (i.e., a value close to zero volt). In step S206, when it is determined that the discharging of the power storage unit 12 is completed, the processing proceeds to step S207.

In step S207, the control unit 15 outputs the switching command for turning off all of the switching devices to the AC-DC conversion unit 11. Accordingly, the power conversion operation by the AC-DC conversion unit 11 is paused, and the operation of the motor driving apparatus 1 is completely paused. Through each processing in the above-described step S201 to step S207, the power storage unit 12 is discharged, and thus, for example, when an operator touches the power storage unit 12 for maintenance, he/she will not get an electric shock.

As described above, in the present invention, the switch unit 21 for shorting the charging resistor is opened (turned off) to flow the charge stored in the power storage unit 12 to the charging resistor 22, so that it is preferable that the switch unit 21 for shorting the charging resistor is realized by a mechanical component, such as a mechanical relay and a mechanical switch, that does not allow a current to flow when opened (turned off) or an electronic component, such as a triac (registered trademark) (a bidirectional thyristor) that does not easily allow a current to flow when opened (turned off) and a switching device (i.e., a GaN FET) that does not include a parasitic diode.

Energy $W_C$ stored in the power storage unit 12 is expressed by Equation 1 when capacitance of the power storage unit 12 is C, and a voltage of the power storage unit 12 (i.e., a potential difference between the point A and the point B) is V.

$$W_c = \frac{1}{2}CV^2 \qquad (1)$$

Energy $W_R$ consumed in the charging resistor 22 when the power storage unit 12 is charged from zero volt to V volt is expressed by Equation 2 when a resistance value of the charging resistor 22 is R, and a current flowing through the power storage unit 12 is i.

$$W_R = \int_0^\infty Ri^2 dt = \int_0^\infty \frac{V^2}{R} e^{\frac{2}{RC}i} dt = \frac{1}{2}CV^2 \qquad (2)$$

Equation 3 is established from Equation 1 and Equation 2.

$$W_C = W_R \qquad (3)$$

Equation 3 represents that it is not particularly necessary to increase a cooling performance when the charging resistor 22 is used in the discharging of the power storage unit 12. In other words, according to the present invention, a discharging function can be imparted to the power storage unit 12 with the present configuration of the initial charging unit 13 without additional costs and an additional mounting area.

Subsequently, second and third embodiments are described which include a temperature detection unit for detecting a temperature of the charging resistor 22.

Figure 4:
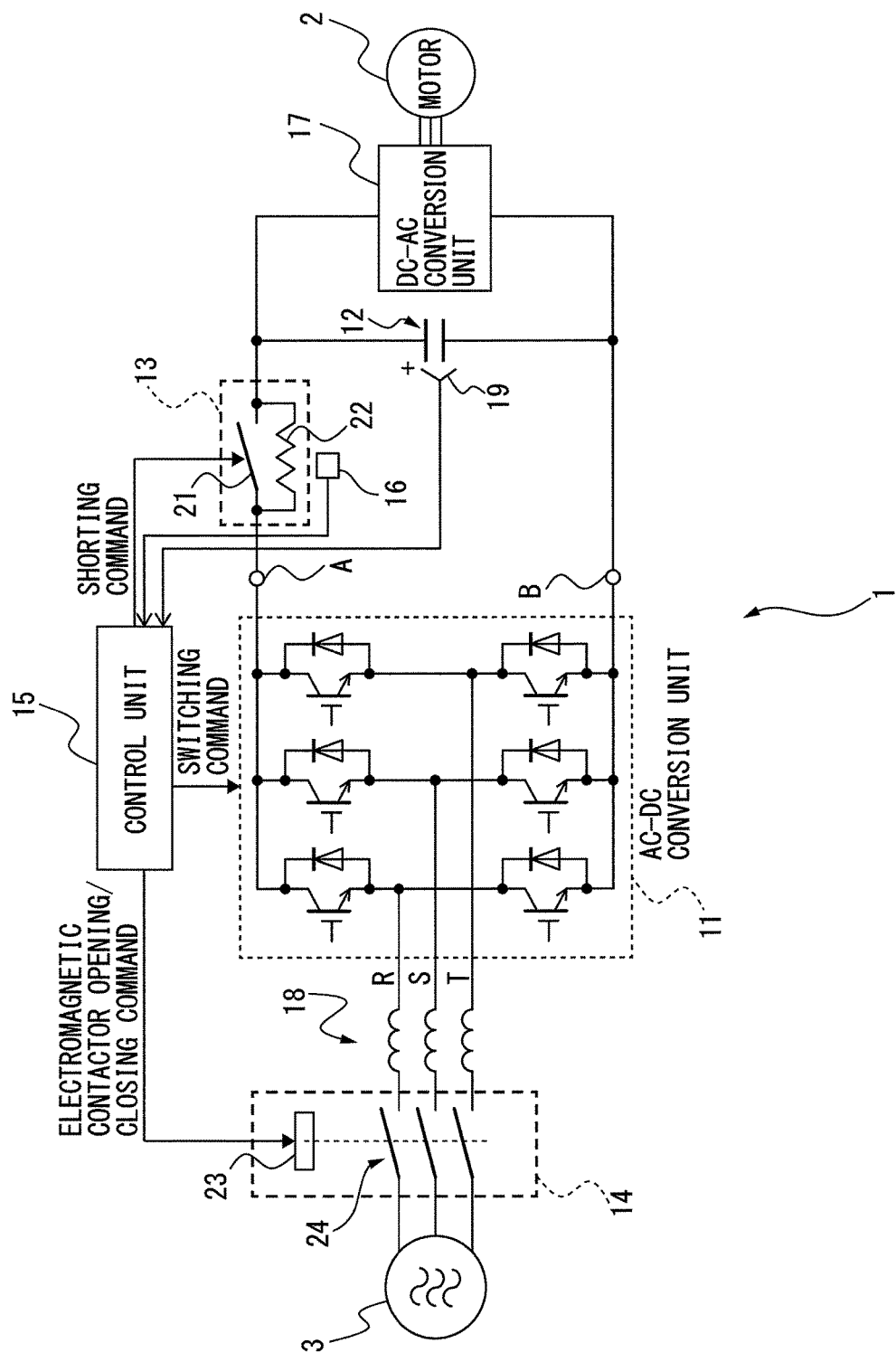
FIG. 4 is a circuit diagram illustrating a motor driving apparatus in second and third embodiments.

FIG. 4 is a circuit diagram illustrating a motor driving apparatus in the second and third embodiments. The second and third embodiments have a configuration in which a temperature detection unit 16 for detecting a temperature of the charging resistor 22 is added to the motor driving apparatus 1 in the first embodiment described with references to FIG. 1 to FIG. 3. The temperature detection unit 16 may be realized by a method for directly measuring a temperature of the charging resistor 22 using a temperature detecting element or a method for calculating a temperature based on information pieces such as the capacitance of the power storage unit 12, the voltage of the power storage unit 12 detected by the voltage detection unit 19, and a time. Circuit components other than the temperature detection unit 16 are similar to circuit components illustrated in FIG. 1, so that the same circuit components are denoted by the same reference numerals and detail descriptions of the circuit components are omitted.

Figure 5:
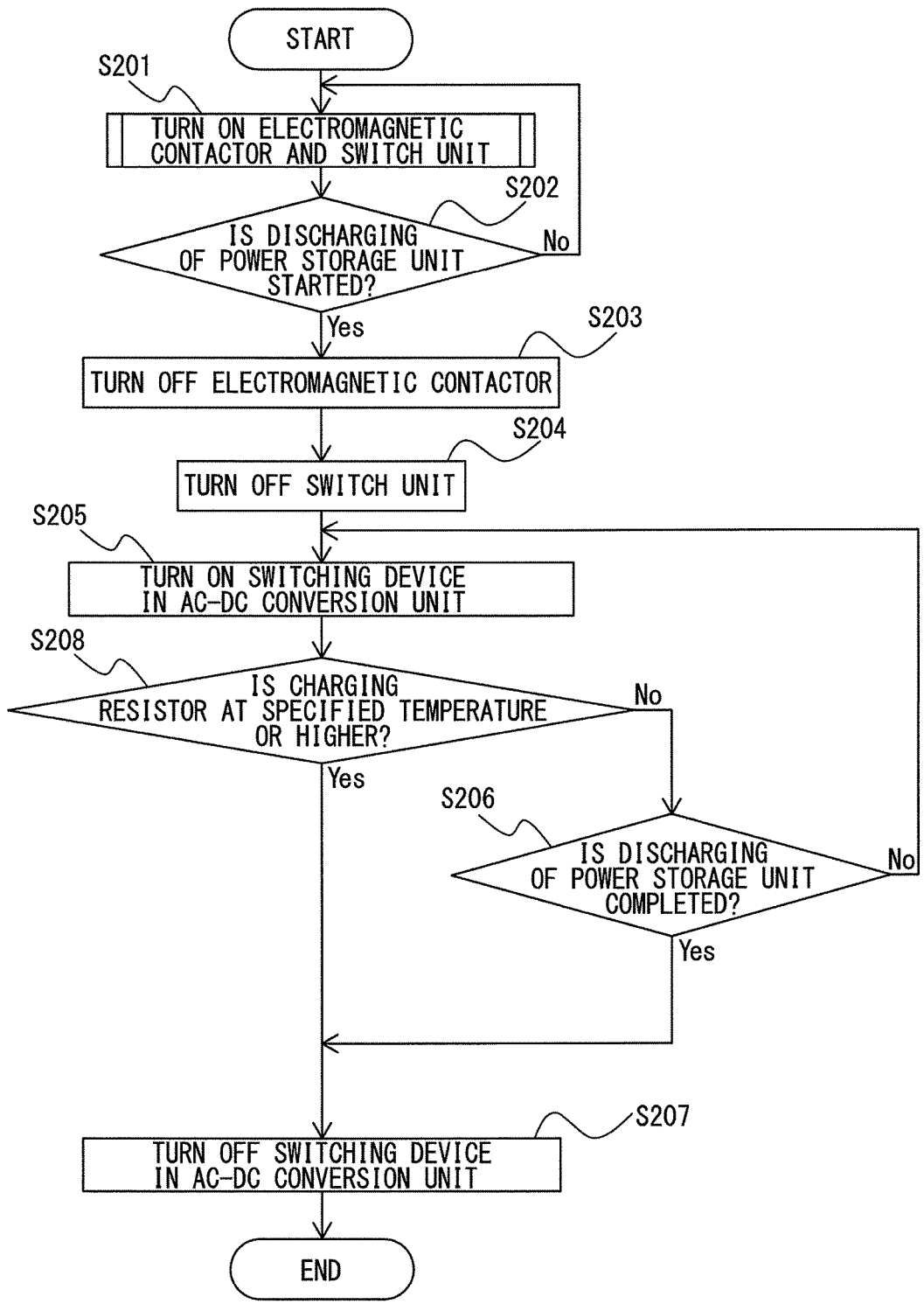
FIG. 5 is a flowchart illustrating an operation flow regarding discharging of a power storage unit of the motor driving apparatus in the second embodiment.

First, operations of the motor driving apparatus in the second embodiment are described with references to FIG. 4 and FIG. 5. FIG. 5 is a flowchart illustrating an operation flow regarding discharging of the power storage unit of the motor driving apparatus in the second embodiment. In the second embodiment, when a temperature detected by the temperature detection unit 16 becomes a specified temperature or more during a discharging operation period after completion of driving of the motor, the control unit 15 performs a turn-off operation on the switching devices respectively provided on the upper arm and the lower arm in the same phase and pauses the discharging by the charging resistor 22 to realize protection of the charging resistor 22 from overheat. Needless to say, the switching device to be turned off to prevent the overheat of the charging resistor 22 may be either one of the upper arm or the lower arm.

In the second embodiment, the initial charging operation of the power storage unit 12 by the initial charging unit 13 is similar to that in the first embodiment described with reference to FIG. 2, so that the description thereof is omitted, and the discharging operation of the power storage unit 12 is described here.

In FIG. 5, each processing in step S201 to step S205 is similar to that in the first embodiment described with reference to FIG. 3.

In step S208 in FIG. 5, the control unit 15 determines whether the temperature detected by the temperature detection unit 16 becomes the specified temperature or higher. The specified temperature may be set to, for example, a temperature at which the charging resistor 22 is not fused when the charging resistor 22 is overheated by an excessive current flowing through the charging resistor 22.

When it is determined in step S208 that the temperature detected by the temperature detection unit 16 becomes the specified temperature or higher, the processing proceeds to step S207, and the control unit 15 outputs the switching command for turning off all of the switching devices to the AC-DC conversion unit 11. Accordingly, the power conversion operation by the AC-DC conversion unit 11 is paused, and the operation of the motor driving apparatus 1 is completely paused. Accordingly, overheat of the charging resistor 22 can be prevent from occurring.

When it is determined in step S208 that the temperature detected by the temperature detection unit 16 is lower than the specified temperature, the processing proceeds to step S206. In step S206, the control unit 15 determines whether the discharging of the power storage unit 12 is completed. The determination is made based on, for example, whether the voltage of the power storage unit 12 detected by the voltage detection unit 19 becomes the predetermined voltage or less (i.e., a value close to zero volt). When it is not determined in step S206 that the discharging of the power storage unit 12 is completed, the processing returns to step S205, and the discharging of the power storage unit 12 is continued. When it is determined in step S206 that the discharging of the power storage unit 12 is completed, the processing proceeds to step S207.

In step S207, the control unit 15 outputs the switching command for turning off all of the switching devices to the AC-DC conversion unit 11. Accordingly, the power conversion operation by the AC-DC conversion unit 11 is paused, and the operation of the motor driving apparatus 1 is completely paused. Through each processing in the above-described step S201 to step S207, the power storage unit 12 is discharged, and thus, for example, when an operator touches the power storage unit 12 for maintenance, he/she will not get an electric shock.

Figure 6:
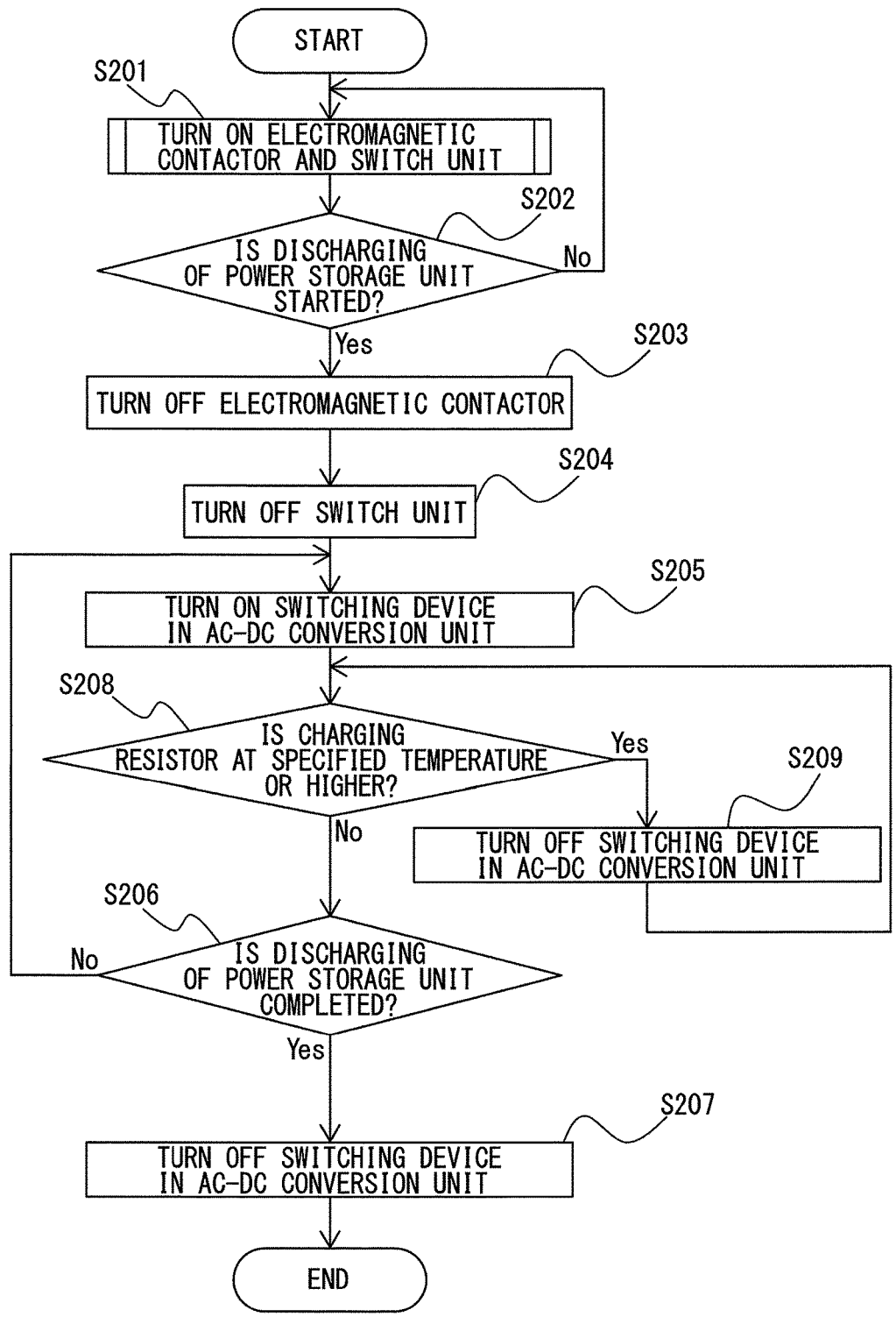
FIG. 6 is a flowchart illustrating an operation flow regarding discharging of a power storage unit of the motor driving apparatus in the third embodiment.
Figure 7:
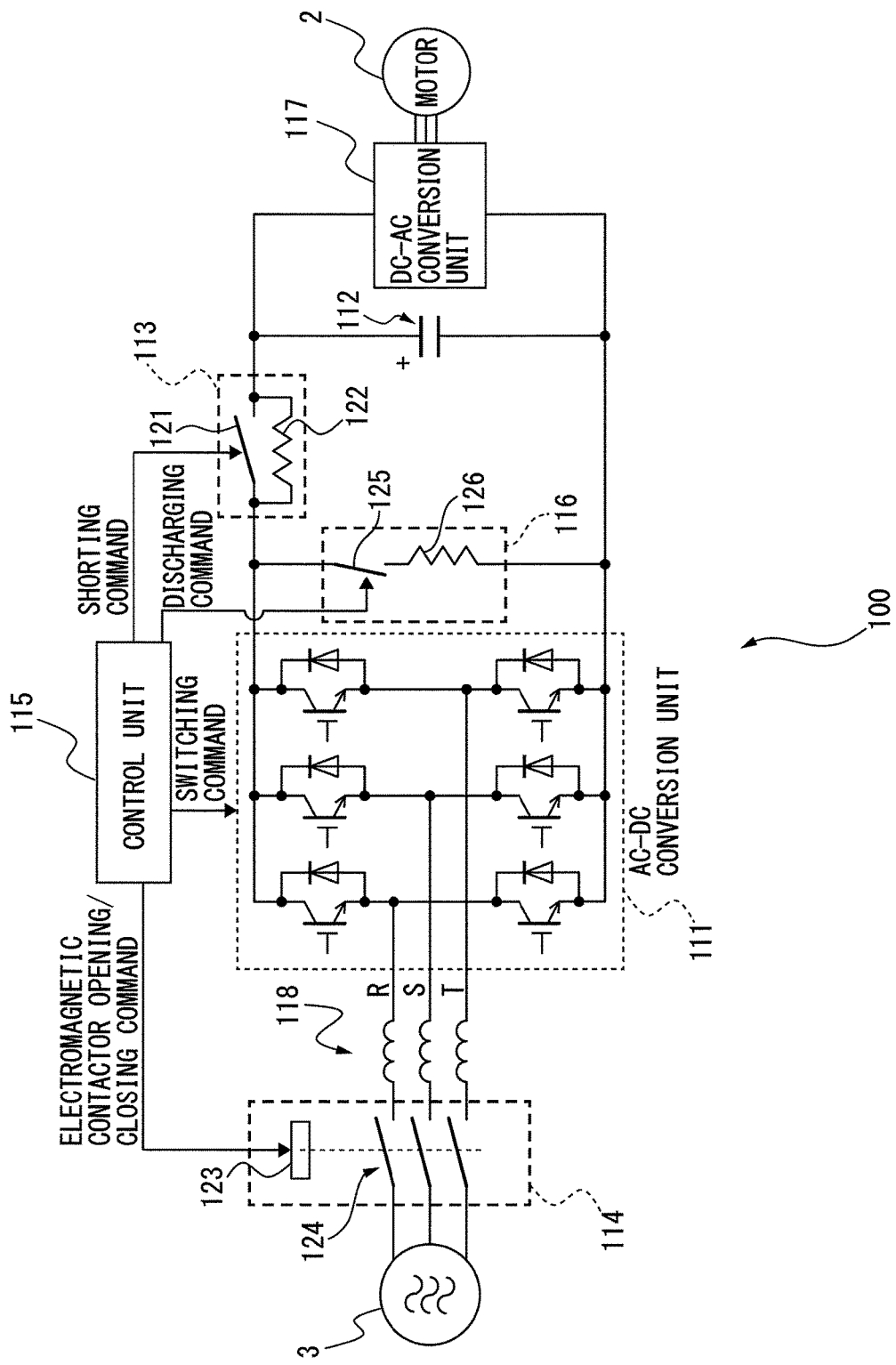
FIG. 7 illustrates a configuration of a general motor driving apparatus including an initial charging unit.
Figure 8:
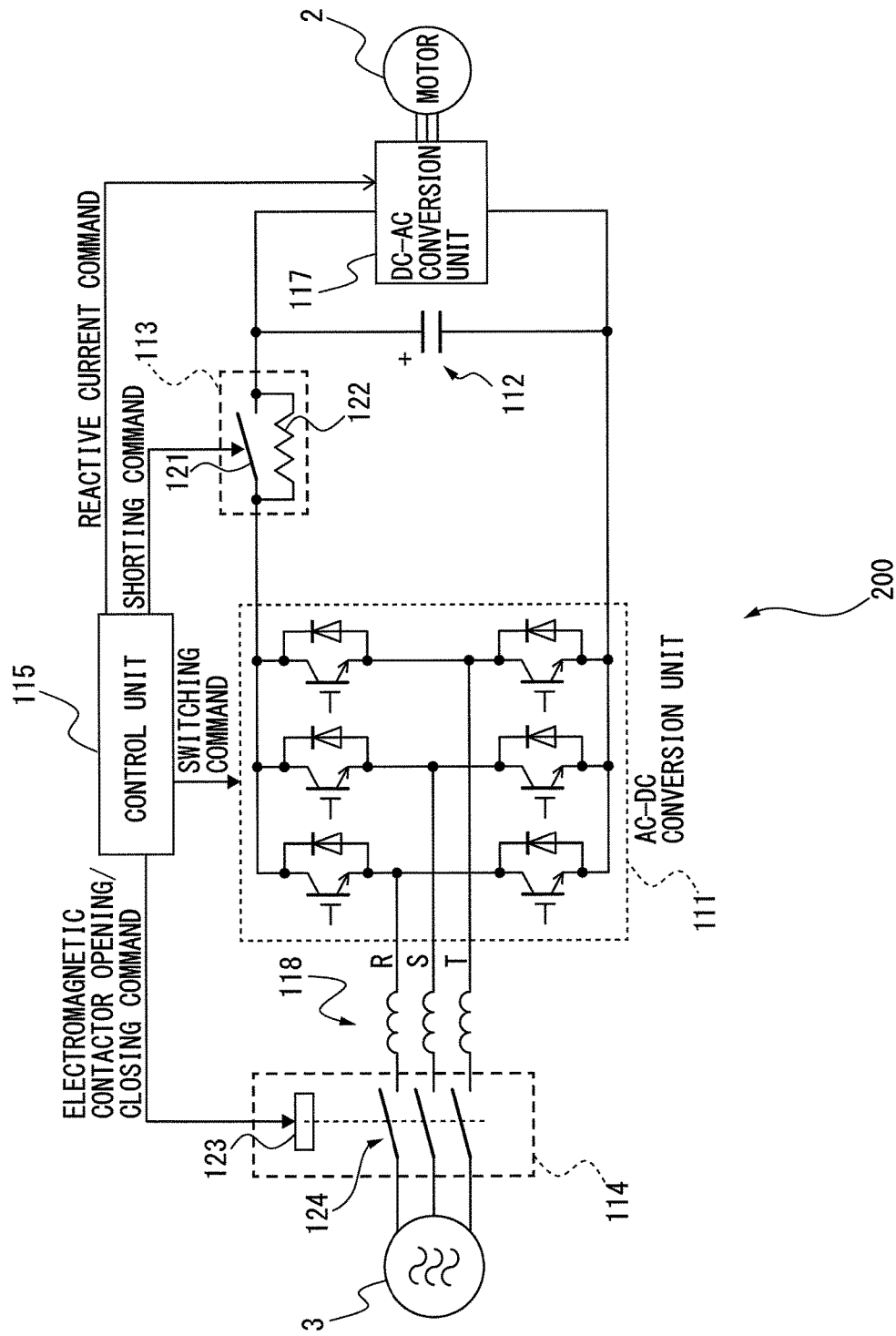
FIG. 8 illustrates discharging of a power storage unit of a motor driving apparatus described in Japanese Patent No. 5444304.

Subsequently, operations of the motor driving apparatus in the third embodiment are described with references to FIG. 4 and FIG. 6. FIG. 6 is a flowchart illustrating an operation flow regarding discharging of the power storage unit of the motor driving apparatus in the third embodiment. In the third embodiment, the control unit 15 continues or stops the discharging of the power storage unit 12 depending on whether the temperature detected by the temperature detection unit 16 is the specified temperature or more and thus realizes secure discharging of the power storage unit 12 and overheat protection for the charging resistor 22 during the discharging operation period after completion of driving of the motor.

In the third embodiment, the initial charging operation of the power storage unit 12 by the initial charging unit 13 is similar to that in the first embodiment described with reference to FIG. 2, so that the description thereof is omitted, and the discharging operation of the power storage unit 12 is described here.

In FIG. 6, each processing in step S201 to step S205 is similar to that in the first embodiment described with reference to FIG. 3.

In step S208 in FIG. 6, the control unit 15 determines whether the temperature detected by the temperature detection unit 16 becomes the specified temperature or higher. The specified temperature may be set to, for example, a temperature at which the charging resistor 22 is not fused when the charging resistor 22 is overheated by an excessive current flowing through the charging resistor 22.

When it is determined in step S208 that the temperature detected by the temperature detection unit 16 becomes the specified temperature or higher, the processing proceeds to step S209, and the control unit 15 outputs the switching command for turning off all of the switching devices to the AC-DC conversion unit 11. Accordingly, the power conversion operation by the AC-DC conversion unit 11 is once stopped. Accordingly, overheat of the charging resistor 22 can be prevent from occurring. After the processing in step S209, the processing returns to step S208. Needless to say, the switching device to be turned off to prevent the overheat of the charging resistor 22 may be either one of the upper arm or the lower arm.

When it is determined in step S208 that the temperature detected by the temperature detection unit 16 is lower than the specified temperature, the processing proceeds to step S206.

When it is determined in step S208 that the temperature detected by the temperature detection unit 16 is lower than the specified temperature, the processing proceeds to step S206. In step S206, the control unit 15 determines whether the discharging of the power storage unit 12 is completed. The determination is made based on, for example, whether the voltage of the power storage unit 12 detected by the voltage detection unit 19 becomes the predetermined voltage or less (i.e., a value close to zero volt). When it is not determined in step S206 that the discharging of the power storage unit 12 is completed, the processing returns to step S205, and the discharging of the power storage unit 12 is continued. In step S206, when it is determined that the discharging of the power storage unit 12 is completed, the processing proceeds to step S207.

In step S207, the control unit 15 outputs the switching command for turning off all of the switching devices to the AC-DC conversion unit 11. Accordingly, the power conversion operation by the AC-DC conversion unit 11 is paused, and the operation of the motor driving apparatus 1 is completely paused. Through each processing in the above-described step S201 to step S207, the power storage unit 12 is discharged, and thus, for example, when an operator touches the power storage unit 12 for maintenance, he/she will not get an electric shock.

As described above, in the third embodiment, when the temperature detected by the temperature detection unit 16 is lower than the specified temperature, the discharging of the power storage unit 12 is continued, whereas when the temperature becomes the specified temperature or higher, the discharging of the power storage unit 12 is once stopped during the discharging operation period after completion of driving of the motor. Accordingly, secure discharging of the power storage unit 12 and overheat protection for the charging resistor 22 can be realized.

According to the present invention, the motor driving apparatus which converts the AC power supplied from the AC power source side into the DC power by the AC-DC conversion unit, outputs the DC power to the DC link provided with the power storage unit, and further converts the DC power into the AC power for driving the motor and supplying the AC power to the motor can be realized as a space saving and low cost motor driving apparatus which can discharge the charge stored in the power storage unit in a short time.

According to the present invention, the charge stored in the power storage unit is discharged using the charging resistor in the initial charging unit which initially charges the power storage unit provided in the DC link, so that addition of a mounting area for discharging and additional costs are not generated.

Further, according to the present invention, when the temperature of the charging resistor becomes the specified temperature or higher, the discharging of the charging resistor is stopped or paused, so that the overheat of the charging resistor can be prevent from occurring, and there is no risk of fusing of the charging resistor.

What is claimed is:

1. A motor driving apparatus comprising:
    an alternating current (AC)-direct current (DC) conversion unit configured to convert AC power supplied from an AC power source side into DC power by performing on-off control on switching devices respectively provided on an upper arm and a lower arm or turning off all of the switching devices and rectifying the AC power by diodes;
    a power storage unit provided in a DC link between a DC output side of the AC-DC conversion unit and a DC input side of a DC-AC conversion unit configured to convert DC power on the DC output side of the AC-DC conversion unit into AC power for driving a motor;
    an initial charging unit provided in the DC link and comprising a switch unit configured to open and close an electrical path between the AC-DC conversion unit and the power storage unit and a charging resistor connected to the switch unit in parallel, wherein the initial charging unit is configured to initially charge the power storage unit by a direct current from the AC-DC conversion unit flowing through the charging resistor when the switch unit is opened before start of driving of the motor;
    an electromagnetic contactor configured to open and close an electrical path between the AC power source and the AC-DC conversion unit; and
    a control unit configured to control each of the switching devices, the switch unit, and the electromagnetic contactor,
    wherein, after completion of driving of the motor, the control unit performs an opening operation on the electromagnetic contactor and the switch unit and performs a turn-on operation on each of the switching devices provided on the upper arm and the lower arm in the same phase, and thus forms a closed circuit constituted of the power storage unit and the charging resistor to discharge charge stored in the power storage unit by the charging resistor.

2. The motor driving apparatus according to claim 1, wherein, before start of driving of the motor, the control unit performs a closing operation on the electromagnetic contactor and performs an opening operation on the switch unit to open the switch unit, and initially charges the power storage unit by a direct current from the AC-DC conversion unit flowing through the charging resistor, and after a voltage of the power storage unit reaches a specified voltage by initial charging, the control unit performs a closing operation on the switch unit to complete initial charging of the power storage unit.

3. The motor driving apparatus according to claim 1 further comprising:
    a temperature detection unit configured to detect a temperature of the charging resistor,
    wherein, after completion of driving of the motor, when a temperature detected by the temperature detection unit becomes a specified temperature or higher, the control unit performs a turn-off operation on each of the switching devices provided on the upper arm or the lower arm in the same phase to pause discharging by the charging resistor.

4. The motor driving apparatus according to claim 1 further comprising:
    a temperature detection unit configured to detect a temperature of the charging resistor,
    wherein, after completion of driving of the motor, when a temperature detected by the temperature detection unit is lower than a specified temperature, the control unit performs an opening operation on the electromagnetic contactor and the switch unit and performs a turn-on operation on each of the switching devices provided on the upper arm and the lower arm in the same phase, and thus forms a closed circuit constituted of the power storage unit and the charging resistor to discharge charge stored in the power storage unit by the charging resistor, and when a temperature detected by the temperature detection unit is the specified temperature or higher, the control unit performs a turn-off operation on each of the switching devices provided on the upper arm or the lower arm in the same phase to stop discharging by the charging resistor.

* * * * *